3,729,503
AROMATIC ESTERS OF TERPENE ALCOHOLS
Henry G. Gribou, Chesterfield, and Alfred A. Schleppnik, St. Louis, Mo., assignors to Monsanto Company, St. Louis, Mo.
No Drawing. Filed Apr. 28, 1969, Ser. No. 819,966
Int. Cl. C07c 69/76, 69/78
U.S. Cl. 260—476 C                                  7 Claims

ABSTRACT OF THE DISCLOSURE

Esters of terpene alcohols with organic acids are prepared in neutral or alkaline medium in order to avoid acid catalyzed dehydration and/or skeletal rearrangements. Organic acid halides, anhydrides or esters are used as acylating agents under the proper conditions. The terpene esters have a characteristic long lasting floral-woody aroma and are useful in the production of perfumes and perfume products.

BACKGROUND OF THE INVENTION

This invention relates to the art of perfumes and, more particularly, to a novel class of aromatic compounds possessing a characteristic fragrance. More specifically, this invention is directed to a novel class of useful aromatic compounds consisting of bicyclic terpene esters and preparation of same.

The art of perfumery began, perhaps, in the ancient cave dwellings of prehistoric man. From its inception, and until comparatively recently, the perfumer has utilized natural perfume chemicals of animal and vegetable origin. Thus, natural perfume chemicals such as the essential oils, for example oil of rose and oil of cloves, and animal secretions, such as musk, have been manipulated by the perfumer to achieve a variety of fragrances. In more recent years, however, research perfume chemists have developed a large number of synthetic odoriferous chemical possessing aromatic characteristics particularly desired in the art. These synthetic aromatics have added a new dimension to the ancient art of the perfumer, since the compounds prepared are usually of a stable chemical nature, are inexpensive as compared with the natural chemical aromatics and lend themselves more easily to manipulation than natural products since such natural products are usually a complex mixture of substances which defy chemical analysis. In contrast thereto, the synthetic substances possess a known chemical structure and may therefore be manipulated by the perfumer to suit specific needs. Accordingly, there is a great need in the perfume art for new synthetic compounds possessing specific characteristic aromas.

SUMMARY OF THE INVENTION

In accordance with the present invention, there is provided a novel class of bicyclic terpene esters. The compounds of this invention are prepared by the reaction of a bicyclic terpene alcohol with an acylating agent in a neutral or alkaline medium. The class of compounds as a whole exhibits a characteristic and long lasting floral-woody aroma which is highly useful in the preparation of perfumes and perfumed products.

The principal object of the present invention is to provide a new class of aromatic compounds consisting of esters of bicyclic terpene alcohols.

Another object of the present invention is to provide a novel process for the preparation of terpene esters whereby the product is obtained in essentially pure form, and in the absence of by-products having a competing aroma.

Another object of the invention is to provide a specific class of chemical compounds having a characteristic aroma which are utilized in the preparation of perfumes and perfume products.

A further object of the invention is to provide a novel process for the preparation of terpene esters wherein dehydration and/or skeletal rearrangement is precluded.

These and other objects, aspects and advantages of this invention will become apparent from a consideration of the accompanying specification and claims.

In accordance with the above objects, there is provided by the present invention a novel class of compounds characterized by the formula

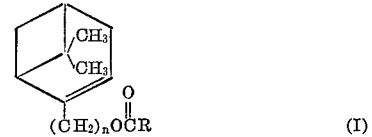

(I)

wherein R represents hydrogen, an alkyl group of 1 to about 10 carbon atoms, an alkenyl group of from 2 to about 10 carbon atoms, a phenyl group, a heterocyclic group or a cyclohexyl group and $n$ represents the integers 1, 2, 3 or 4.

Representative alkyl groups characterized by R include alkyl groups having from 1 to about 10 carbon atoms, such as methyl, ethyl, propyl, isopropyl, butyl, isobutyl, tert-butyl, amyl, hexyl, heptyl, octyl, nonyl, and decyl. Alkenyl groups represented by R include those alkenyl radicals having from 2 to about 10 carbon atoms such as ethenyl, propenyl, butenyl, pentenyl, hexenyl, heptenyl, octenyl, nonenyl and decenyl.

R represents phenyl, alkylphenyl such as tolyl, xylyl, benzyl, β-styryl and the like, hydroxyphenyl such as o-, m- or p-hydroxyphenyl, and aminophenyl such as o-, m- or p-aminophenyl and the like.

Similarly, where R represents a cyclohexyl group it is understood that such term includes substituted cyclohexyl. Accordingly, R represents cyclohexyl or o-, m- or p-substituted alkylcyclohexyl such as methylcyclohexyl, ethylcyclohexyl and the like.

Representative heterocyclic groups represented by R include furyl, pyrryl, pyrrolinyl, oxazolyl, isoxazolyl as well as benzofuryl, benzopyrryl and the like.

The novel compounds of this invention are prepared by reacting a terpene alcohol, which undergoes dehydration or rearrangement in the presence of acid, such as certain bicyclic terpene alcohols, with an organic acid halide or acid anhydride in the presence of a slight excess of a suitable base or with an ester of an organic acid and a lower alcohol, preferably methanol, in the presence of a neutral or basic catalyst.

The bicyclic terpene alcohols are represented by the formula

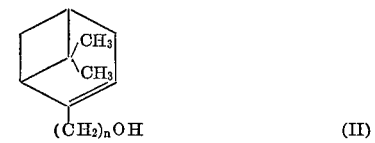

(II)

wherein $n$ is defined above with regard to Formula I.

Typical terpene alcohols embraced by the above definition include nopol and its homologues.

Representative organic acid esters, halides or anhydrides which are reacted with the bicyclic terpene alcohols described above to afford the novel esters of the present invention include methyl formate, ethyl acetate, methyl propionate, ethyl caprylate, n-propyl pelargonate, ethyl undecylate, methyl acrylate, ethyl propylacrylate, methyl benzoate, methyl phenylacetate, methyl salicylate, ethyl aminobenzoate, methyl naphthenate, methyl methylnaphthenate, methyl furancarboxylate, acetyl chloride, propionyl chloride, undecylyl chloride, acrylyl chloride, benzoyl chloride, hexahydrobenzoyl chloride, acetic anhydride, propionic anhydride, mixed acid anhydrides, obtained by known techniques from a carboxylic acid and an acid chloride or from a carboxylic acid and an acid anhydride, e.g. formyl acetic anhydride and the like.

In a preferred embodiment of this invention, the alcohol of Formula II is reacted with an organic acid ester, such as methyl phenylacetate, in the presence of a basic catalyst. Typical catalysts which are used in the practice of this invention are alkali metal alkoxides, e.g. sodium methoxide, potassium ethoxide, alkali metal hydrides and borohydrides, e.g. sodium hydride, sodium borohydride and the like. Preferably, the catalyst is the alkali metal alcoholate of the alcohol utilized in the reaction and it is conveniently prepared in situ by adding the corresponding alkali metal hydride, complex hydride or lower alkoxide, e.g. methoxide, ethoxide, butoxide, to the alcohol. Of less use, but nevertheless active, are the soluble salts of the acid moiety used, such as sodium benzoate or lithium salicylate in transesterification with benzoates or salicylates. The amount of catalyst added depends on the particular reactants employed and the reaction conditions. The catalyst may be added all at once or incrementally during the reaction.

By virtue of the above-described procedure, the desired product is not contaminated by acid which would ordinarily be carried over in an esterification procedure. For example, the reaction of nopol with phenylacetic acid under basic reaction conditions affords nopol phenylacetate together with water and traces of phenylacetic acid. Under certain circumstances this would be permissible. In the case, however, of a compound utilized for its characteristic fragrance, the contamination by phenylacetic acid and its accompanying odor is not permissible. Accordingly, the reaction is preferably carried out as a transesterification procedure between the terpene alcohol and an organic acid ester in the presence of a basic catalyst. The lower alcohol formed in the reaction is preferably continuously removed by distillation at suitable pressure or by selective inclusion in a molecular sieve.

Of course, as stated above, the reaction may be run in the presence of an organic acid halide, anhydride, or mixed anhydride in lieu of the organic acid ester, but when using an organic acid halide, anhydride, or mixed anhydride care must be taken to prevent the acidic conditions from disrupting the ring of the bicyclic terpene alcohol or the ester prepared therefrom. Accordingly the pH of the reaction should be kept at least at about pH 7 when an organic acid derivative, other than an ester, is utilized for preparing the compounds of this invention.

The addition of an appropriate amount of a basifying agent, for example amines such as trialkylamines, pyridines, substituted pyridines, dialkylanilines and the like will maintain neutral or basic reaction conditions.

The proportion of bicyclic terpene alcohol to the acid or acid derivative utilized in the process of this invention is not critical but, in general is on the order of a 1:1 ratio. A slight excess of either reactant may, however, be used.

The reaction conditions are not critical but should be such as to facilitate the removal of lower alcohol formed during the reaction. Thus, the reaction is normally conducted at a temperature of from about 60° C. to 200° C. or higher and at pressures up to about 100 mm.

The novel compounds of this invention are useful in the preparation and formulation of perfumes and perfumed products due to their pleasing floral-woody aroma. Perfume compositions and the use thereof in cosmetic, detergent and bar soap formulations and the like are exemplary of the utility thereof. The compounds of this invention are used in concentrations of from trace amounts to about 10% of the perfume composition into which they are incorporated. As will be expected, the concentration will vary depending on the particular perfume formula and even within the same formula when compounded by different perfumers.

The following examples will serve to illustrate certain specific embodiments within the scope of this invention and are not to be construed as limiting the scope thereof.

EXAMPLE 1

A mixture of 450 g. of methyl phenylacetate and 500 g. of nopol (3 moles each), containing 500 mg. of sodium hydride was slowly heated with stirring to a pot temperature of 190° C. Methanol (100 ml.) was distilled off through a short, heated, Vigreux-type column. Vacuum was then applied and product, after a small forerun, was collected at 176° C./3 mm., as a colorless liquid, $n$ 25D 1.5185. The yield of nopyl phenylacetate was 796.4 g. (97.6%)

A second run afforded 97% yield of the product, which had a boiling point of 157° C./1.2 mm., $n$ 25D 1.5189.

EXAMPLE 2

A mixture of 162.2 g. of methyl cinnamate and 162.2 g. of nopol containing 500 mg. of sodium methoxide was slowly heated with stirring to a pot temperature of 190° C. Methanol (100 ml.) was distilled off through a short, heated, Vigreux-type column. Vacuum was then applied and nopyl cinnamate, after a small forerun, was collected as a liquid, $n$ 25D 1.5546, B.P. 174°/0.5 mm.

EXAMPLE 3

A mixture of 152.2 g. of methyl salicylate and 166.3 g. of nopol containing 500 mg. of sodium methoxide was slowly heated with stirring to a pot temperature of 190° C. Methanol (100 ml.) was distilled off through a short, heated, Vigreux-type column. Vacuum was then applied and nopyl salicylate was collected as a liquid, $n$ 25D 1.5335, B.P. 153° C./0.3 mm.

EXAMPLE 4

A mixture of 136.2 g. of methyl benzoate and 166.3 g. of nopol (1 mole each) containing 200 mg. of lithium hydride was slowly heated with stirring to a pot temperature of 190° C. Methanol (100 ml.) was distilled off through a short, heated Vigreux-type column. Vacuum was then applied and nopyl benzoate was collected as a liquid, n 25D 1.5250, B.P. 138° C./0.2 mm.

EXAMPLE 5

A mixture of 60.4 g. of methyl anthranylate and 56.0 g. of nopol containing 100 mg. of sodium methoxide was slowly heated with stirring to a pot temperature of 190° C. Methanol (100 ml.) was distilled off through a short, heated, Vigreux-type column. Vacuum was then applied and nopyl anthranylate was collected as a liquid, $n$ 25D 1.5595, B.P. 187° C./2 mm.

EXAMPLE 6

A typical rose for perfumes and colognes, comprising nopyl phenylacetate, is set forth below.

| Ingredient: | Parts/weight |
| --- | --- |
| Nopyl phenylacetate | 50 |
| Geraniol | 350 |
| Rhodinol | 100 |
| Citronellol | 100 |
| Ionone alpha | 100 |
| Jasmin absolute | 100 |
| Nerol | 20 |
| Phenyl ethyl alcohol | 250 |
| | 1,000 |

The rose has a pleasant long-lasting floral fragrance having a woody note.

EXAMPLE 7

A typical composition, comprising nopyl phenyl acetate, useful as a rose for soaps is set forth below.

| Ingredient: | Parts/weight |
|---|---|
| Nopyl phenylacetate | 50 |
| Ionone beta | 150 |
| Geraniol | 350 |
| Musk xylol | 50 |
| Diphenyl oxide | 50 |
| Geranium bourbon | 100 |
| Terpineol | 100 |
| Phenyl ethyl alcohol | 150 |
| | 1,000 |

The rose imparts a floral-woody aroma to soaps in which it is incorporated.

While this invention has been described hereinabove with regard to certain illustrative specific embodiments, it is not so limited since many modifications and variations are possible in the light of the above teachings. It is understood therefore that the invention may be practiced otherwise than as specifically described without departing from the spirit and scope of the invention.

The embodiments of this invention in which an exclusive property or privilege is claimed are defined as follows:

1. An ester of a bicyclic terpene alcohol, said ester being represented by the structural formula

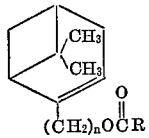

wherein R represents a phenyl group, an alkylphenyl group, a phenylalkyl group and a phenylalkenyl group; and $n$ represents the integers 2, 3 or 4.

2. An ester as defined in claim 1 wherein $n$ represents 2.
3. An ester as defined in claim 1 wherein $n$ represents 3.
4. An ester as defined in claim 1 wherein $n$ represents 4.
5. An ester as defined in claim 1 which is nopyl phenylacetate.
6. An ester as defined in claim 1 which is nopyl cinnamate.
7. An ester as defined in claim 1 which is nopyl benzoate.

References Cited

UNITED STATES PATENTS

| | | | |
|---|---|---|---|
| 907,941 | 12/1908 | Zeitschel | 260—410 |
| 2,232,434 | 2/1941 | Borglin | 260—489 |
| 2,052,995 | 9/1936 | Whitmore | 260—489 |
| 2,340,294 | 2/1944 | Bain | 260—489 |
| 2,424,960 | 8/1947 | Bain et al. | 260—489 |
| 2,427,345 | 9/1947 | Bain | 260—489 |
| 2,272,400 | 2/1942 | Borglin | 260—487 |

OTHER REFERENCES

Justus Liebigs Annalen der Chemie, vol. 409, pp. 327–357, Chemistry & Industry, Sept. 24, 1966, Roelofsen et al.

LORRAINE A. WEINBERGER, Primary Examiner

R. S. WEISSBERG, Assistant Examiner

U.S. Cl. X.R.

252—522; 260—307 R, 307 H, 326.13, 326.3, 346.2 R, 347.5, 410, 468 R, 471 R, 473 S, 474, 486 R, 489